(12) United States Patent
Feng et al.

(10) Patent No.: US 11,817,790 B2
(45) Date of Patent: Nov. 14, 2023

(54) HIGH-SIDE SYNCHRONOUS RECTIFIER DRIVER WITH REDUCED CONTROLLER POWER SUPPLY CHARGING EFFICIENCY AND REDUCED EMI

(71) Applicant: DIALOG SEMICONDUCTOR INC., Campbell, CA (US)

(72) Inventors: Guang Feng, Campbell, CA (US); Pengju Kong, Campbell, CA (US); Xiyuan Liu, Campbell, CA (US); Qingqing Zong, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 211 days.

(21) Appl. No.: 17/375,954

(22) Filed: Jul. 14, 2021

(65) Prior Publication Data
US 2023/0016802 A1 Jan. 19, 2023

(51) Int. Cl.
*H02M 3/335* (2006.01)
*H02M 1/44* (2007.01)

(52) U.S. Cl.
CPC ......... *H02M 3/33592* (2013.01); *H02M 1/44* (2013.01)

(58) Field of Classification Search
CPC .......................... H02M 3/33592; H02M 1/44
See application file for complete search history.

(56) References Cited

U.S. PATENT DOCUMENTS

| | | | |
|---|---|---|---|
| 2019/0115844 A1* | 4/2019 | Tang | H02M 3/33592 |
| 2022/0416675 A1* | 12/2022 | Wei | H02M 1/08 |
| 2023/0015445 A1* | 1/2023 | Wu | H02M 1/0006 |

\* cited by examiner

*Primary Examiner* — Kyle J Moody
(74) *Attorney, Agent, or Firm* — Haynes and Boone, LLP (57) ABSTRACT

A flyback converter is provided that includes a high-side synchronous rectifier switch transistor. A secondary-side synchronous rectifier controller powered by a power supply voltage controls a cycling on and off of the high-side synchronous rectifier switch transistor. An active control of the charging of the power supply voltage uses an auxiliary capacitor that is charged from a charge source while a power switch transistor in a first switching state. When the power switch transistor is in a second switching state that is the complement of the first switching state, the active control coupes the auxiliary capacitor to a power supply capacitor that stores the power supply voltage.

20 Claims, 10 Drawing Sheets

FIG. 1A

- Prior Art -

- Prior Art -

HIGH-SIDE SYNCHRONOUS RECTIFIER DRIVER WITH REDUCED CONTROLLER POWER SUPPLY CHARGING EFFICIENCY AND REDUCED EMI

TECHNICAL FIELD

This application relates to switching power converters, and more particularly to an isolated switching power converter with a high-side synchronous rectifier driver having an actively-controlled controller power supply voltage for reduced charging loss and reduced electromagnetic interference (EMI).

BACKGROUND

An isolated switching power converter such as a flyback switching power converter is typically used to charge a mobile device as the converter's transformer provides safe isolation from AC household current. The power switch for a flyback converter is on the primary-winding side of the transformer whereas the output voltage and output current for driving a load are produced at the secondary-winding side of the transformer. The secondary winding current is rectified to not conduct while the power switch is on to conduct the primary-winding current.

Figure 1A:
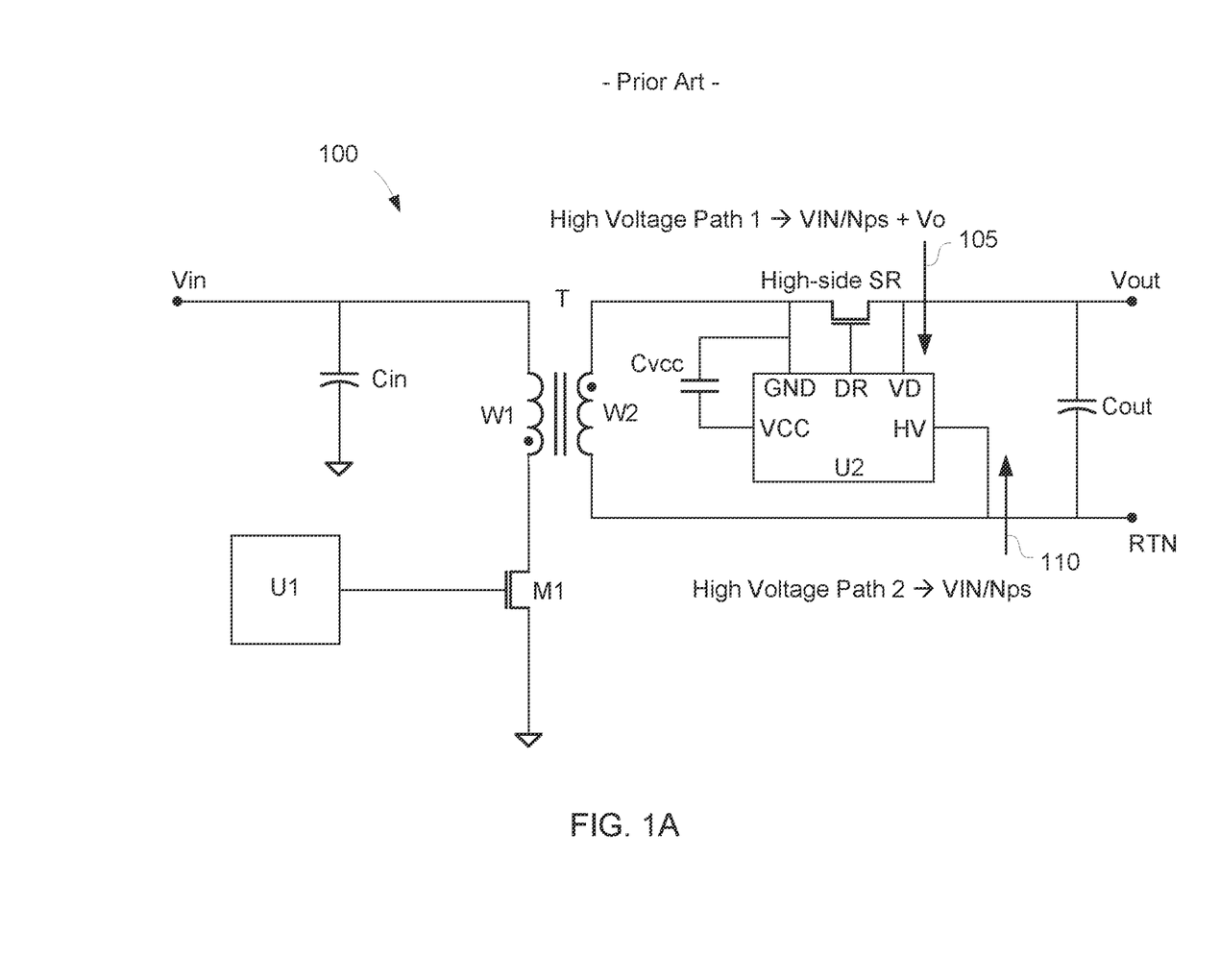
FIG. 1A illustrates a conventional flyback converter with a high-side SR switch transistor.

A diode may be used to rectify the secondary winding current, but the use of a diode lowers efficiency. To increase efficiency, a synchronous rectifier (SR) switch transistor may be used to rectify the secondary winding current. The resulting synchronous rectification may be referred to as active synchronous rectification as compared to the passive synchronous rectification that results from the use of a diode. An example conventional flyback converter 100 with active synchronous rectification is shown in FIG. 1A. A primary-side controller U1 controls the cycling of a power switch transistor M1 coupled between ground and a lower terminal of a primary winding W1 of a transformer T. An upper terminal of the primary winding W1 couples to input voltage rail. An input capacitor Cin couples to the input voltage rail to smooth an input voltage Vin. A secondary-winding W2 of the transformer T couples to an an output voltage rail for providing an output voltage Vout to a load (not illustrated). A return current from the load is received at a return (RTN) terminal that couples to the secondary winding W2 through a return or ground rail.

There are two main choices for a designer to implement or locate the SR switch transistor in a flyback converter: either on the output voltage rail or on the return rail. In flyback converter 100, the SR switch transistor is located on the output voltage rail. The SR switch transistor may thus also be denoted as a high-side SR switch transistor in flyback converter 100. An SR controller (U2) detects when the power switch transistor M1 has been cycled off and switches on the SR switch transistor accordingly. The secondary-winding current then flows through the secondary winding W2 to charge an output capacitor Cout with the output voltage Vout.

Should the SR switch transistor still be on when the power switch transistor M1 is again cycled on, the SR controller switches off the SR switch transistor. While the power switch transistor M1 conducts, a relatively large voltage is impressed across the drain and source of the SR switch transistor because the drain of the SR switch transistor is driven to a sum of Vin/Nps and Vout with respect to the source of the SR switch transistor, where Nps is the turns ratio for the transformer. The input voltage Vin is derived from the rectification of an AC mains voltage and thus may have a relatively high level. For example, the input voltage Vin may be as high as 320 V. In such as case if the Vout is 20 V and the turns ratio is 5, the drain voltage of the SR switch transistor may be driven to 84 V with respect to the source voltage while the power switch transistor is conducting. The return rail is lower than the drain voltage by the output voltage so the RTN terminal voltage (which is the secondary-side ground) would be 64 V with respect to the source voltage for such a scenario.

These relatively high drain and RTN voltages with respect to the SR switch transistor's source voltage while the power switch transistor conducts lowers the efficiency for the production of a power supply voltage VCC for the SR controller. The power supply voltage VCC is stored on a Cvcc capacitor that couples between the source terminal of the SR switch transistor and a VCC terminal for the SR controller. There are two paths through which the Cvcc capacitor may be charged with the power supply voltage VCC. In a first path 105, the Cvcc capacitor is charged from the drain voltage of the SR switch transistor as received by a VD terminal of the SR controller. In a second path 110, the Cvcc capacitor is charged from the RTN terminal voltage as received by an HV terminal of the SR controller.

Figure 1B:
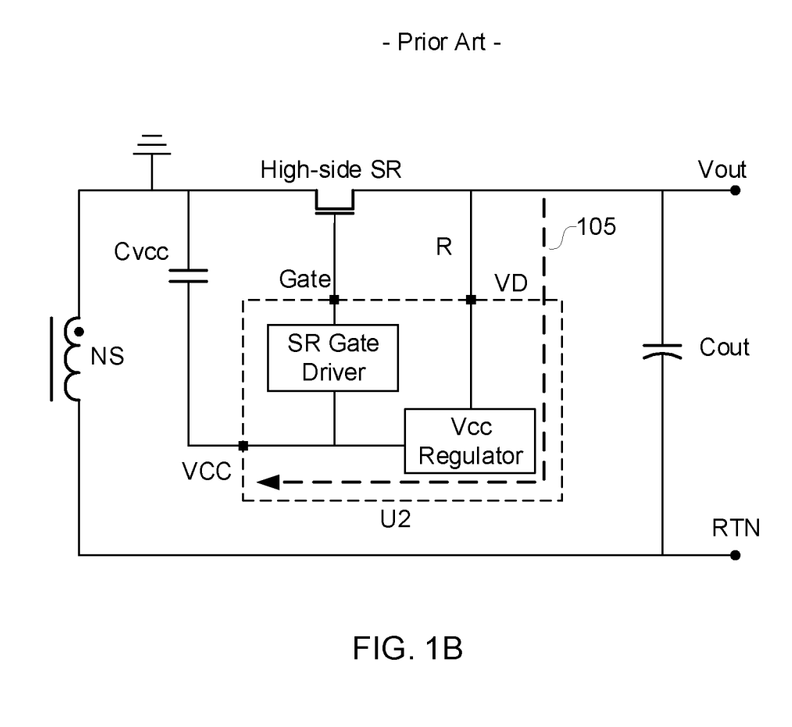
FIG. 1B illustrates the secondary-side of the conventional flyback converter of FIG. 1A in more detail.

Regardless of whether path 105 or 110 is used for the charging of the power supply voltage VCC, a relatively low efficiency results. For example, SR controller U2 and path 105 are shown in more detail in FIG. 1B. Path 105 extends from the drain of the SR switch transistor through the VD terminal of the SR controller U2 and extends through a VCC regulator to the VCC terminal and then to the Cvcc capacitor. The power loss for a conductive path such as path 105 can be shown be proportional to a square of the power for the Cvcc charging. If it is assumed that Vin is 345 V, Nps is 5, and Vout is 20 V as discussed previously, the power is 740 mW. Under the same conditions, the power loss for charging path 110 of FIG. 1A is 540 mW. Since the majority of these significant power losses will be imposed on the internal VCC regulator, the resulting integrated circuit (IC) thermal dissipation will be prohibitive.

Figure 2:
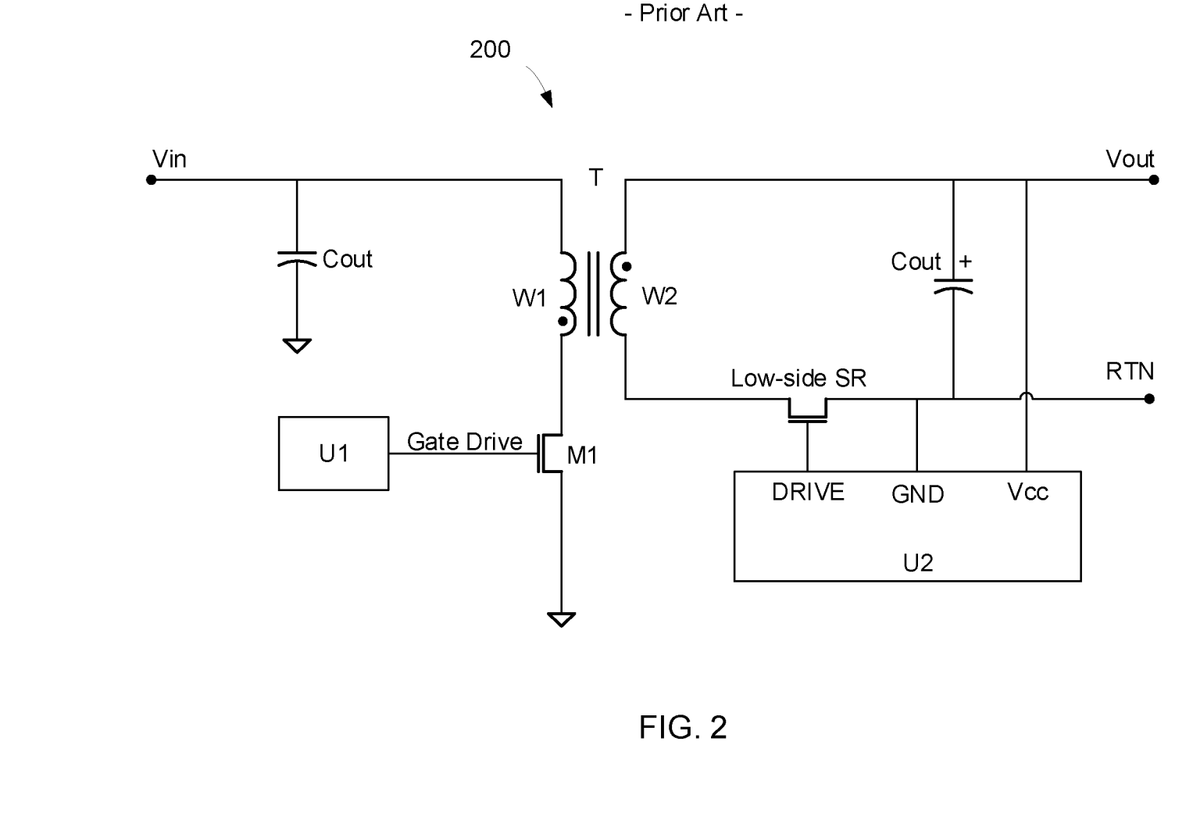
FIG. 2 illustrates a conventional flyback converter with a low-side SR switch transistor.

Given these power losses in the charging of the Cvcc capacitor, it is conventional to instead locate the SR switch on the return rail as shown in FIG. 2 for a flyback converter 200. The resulting SR switch transistor may then be denoted as a low-side SR switch transistor. But a low-side SR switch transistor configuration produces significantly greater EMI as compared to a high-side SR switch transistor because the high-side SR switch transistor may be controlled to be in-phase with the power switch transistor M1. A flyback designer is thus forced to choose between a high-side SR switch transistor implementation with poor efficiency but low EMI or a low-side SR switch transistor implementation with improved efficiency and increased EMI.

SUMMARY

In accordance with an aspect of the disclosure, a controller for a flyback converter with a high-side synchronous rectifier switch transistor is provided that includes: an auxiliary capacitor; a power supply capacitor for storing a power supply voltage for the controller; and a plurality of switches having a first switching state in which the auxiliary capacitor is coupled to a charge source and the power supply capacitor is isolated from the auxiliary capacitor and having a second switching state in which the auxiliary capacitor is isolated from the charge source and coupled to charge the power supply capacitor.

In accordance with another aspect of the disclosure, a method of charging a power supply voltage for a secondary-side flyback controller is provided that includes: while a power switch transistor is in a first switching state, charging an auxiliary capacitor from a charge source while isolating the auxiliary capacitor from a power supply capacitor storing the power supply voltage; while the power switch transistor is a second switching state that is the complement of the first switching state, coupling the auxiliary capacitor to the power supply capacitor to charge the power supply capacitor with the power supply voltage while isolating the auxiliary capacitor from the charge source; and using the power supply voltage to power a controller for controlling a cycling on and off of a high-side synchronous rectifier switch transistor.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A flyback converter with a high-side SR switch transistor is provided with active control of the controller power supply voltage charging for a secondary-side controller. The reduced EMI benefits of a high-side SR switch transistor configuration are thus provided without the conventional drawbacks of reduced efficiency. To generate a controller power supply voltage VCC for the SR controller of the high-side SR switch transistor, the flyback converter includes a secondary-side auxiliary capacitor (Caux) in addition to the power supply capacitor Cvcc that stores the power supply voltage VCC. The active control of the SR controller power supply voltage VCC extends over two switch configuration periods for each cycle of the power switch transistor and the SR switch transistor. In a first period, a plurality of switches function to couple a charge source to the auxiliary capacitor to charge the auxiliary capacitor while the auxiliary capacitor is isolated from the power supply capacitor. The first period may thus also be denoted as the auxiliary capacitor charging period. Conversely, in a second period, the plurality of switches function to isolate the auxiliary capacitor from the charge source and to couple the auxiliary capacitor to the power supply capacitor so the auxiliary capacitor may charge the power supply capacitor. The second period may thus also be denoted as the power supply capacitor charging period. The plurality of switches may be passive (e.g., diodes) or active (switch transistors controlled by the SR controller or another secondary-side controller integrated circuit). The following discussion will be directed to embodiments in which it is the SR controller that controls the plurality of switches, but it will be appreciated that a separate integrated circuit secondary-side controller may be configured for this control. However, the SR controller is a convenient choice for the switch control since the timing of the first and second periods is tied to a detection of the power switch transistor switching and the SR switch transistor switching.

In a first embodiment, the charge source that charges the auxiliary winding is the output capacitor. The plurality of switches would thus function to couple a positive plate of the auxiliary capacitor to the drain of the SR switch transistor in such an implementation while a negative plate of the auxiliary capacitor couples to the return rail so that the output capacitor may charge the auxiliary capacitor. In a second embodiment, the charge source is the secondary winding in which case the plurality of switches function to couple a positive terminal of the secondary winding to the positive plate of the auxiliary capacitor while the negative plate of the auxiliary capacitor couples to the return rail. Regardless of the charge source, the resulting charging of the power supply capacitor with the power supply voltage VCC may be denoted as an active-control charging. This active-control charging may be performed in both a continuous conduction mode (CCM) of operation as well as a discontinuous conduction mode (DCM) of operation for the flyback converter.

The timing of the auxiliary capacitor charging period and power supply capacitor period is tied to the power switch transistor M1 switching state (switched on or switched off). In some implementations, the auxiliary capacitor charging period occurs while the power switch transistor M1 is on. In such implementations, the power supply capacitor charging period thus occurs while the power switch transistor M1 is off. In other implementations, the auxiliary capacitor charging period occurs while the power switch transistor M1 is off. In such implementations, the power supply capacitor charging period thus occurs while the power switch transistor is on. During CCM operation, the active control thus oscillates between the first and second charging periods. A third switching configuration exists for DCM operation as will be explained further herein.

In both DCM and CCM operation, the secondary-winding current declines over the on-time period for the SR switch transistor. Power is delivered to the load (and/or to the charging of the output capacitor Cout) as the secondary-winding current declines. Should the power switch transistor M1 cycle on before the secondary-winding current has declined to zero, a flyback converter is operating in CCM. In CCM, the SR controller detects the cycling on of the power switch transistor M1 and switches off the SR switch transistor. If the secondary-winding current declines to zero before the power switch transistor M1 cycles back on, the flyback converter operates in DCM.

Figure 3:
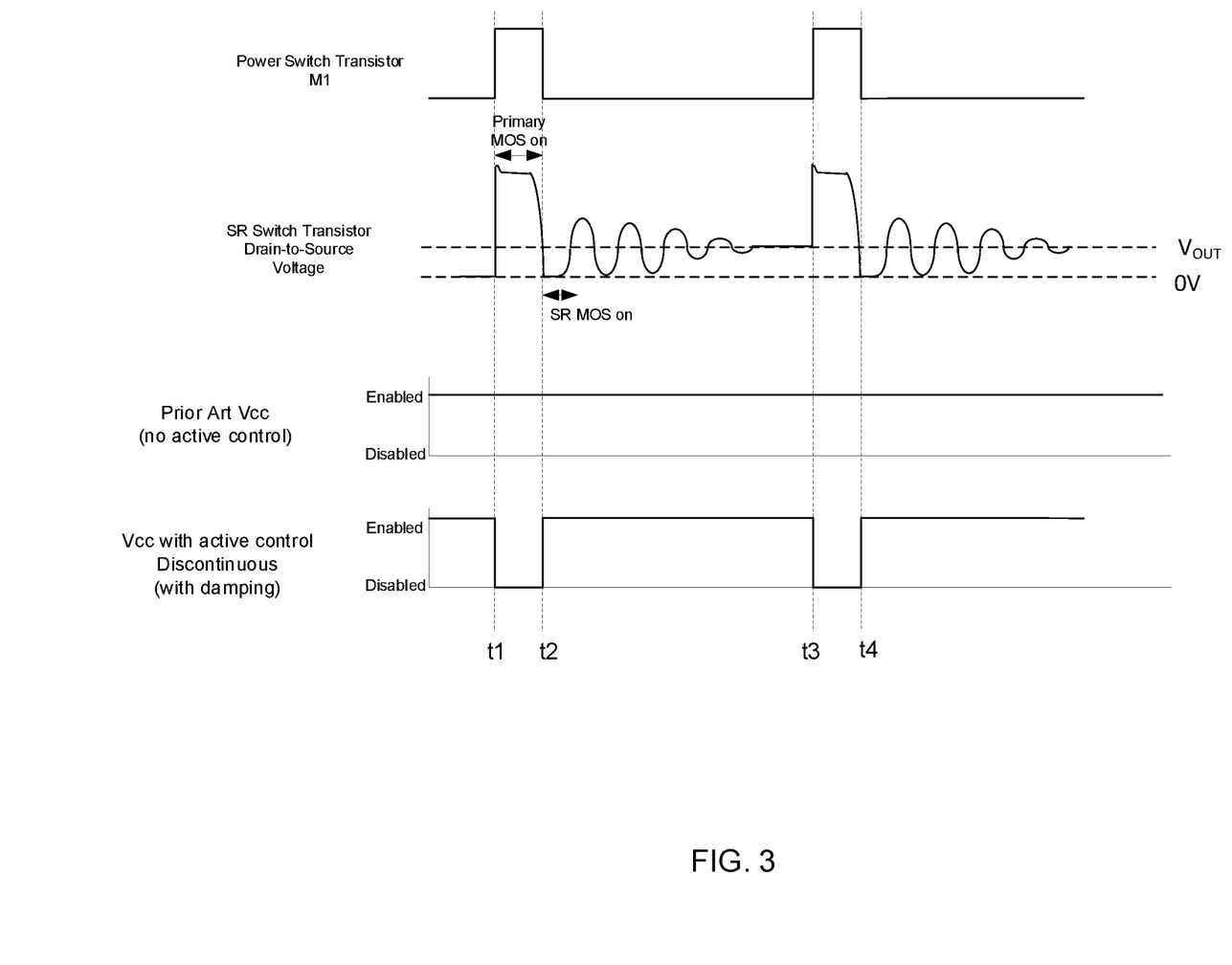
FIG. 3 compares some conventional operating waveforms for discontinuous connection mode (DCM) operation to those for active control in accordance with an aspect of the disclosure.

Waveforms for DCM operation for both conventional and active control of the high-side SR controller power supply voltage are shown in FIG. 3. From a time t1 to approximately a time t2, the power switch transistor M1 is on. With the SR switch transistor being off and the power switch transistor M1 being on, the drain-to-source voltage of the SR switch transistors pulses high. With the power switch transistor M1 on-time period ending at time t2, the SR switch transistor is cycled on, which causes the secondary-winding current to pulse high and causes the SR switch transistor's drain-to-source voltage to drop to zero. When the secondary-winding current declines to zero, the SR controller cycles off the SR switch transistor. With both the SR switch transistor and the power switch transistor M1 being off, the drain-to-source voltage of the SR switch transistor begins resonantly oscillating. This resonant oscillation finally dampens to zero and a new power switch transistor M1 on-time occurs from a time t3 to t4. The conventional charging of the SR controller power supply voltage VCC occurs throughout this cycling of the power switch transistor M1. But with active control, the charging of the power supply capacitor storing the power supply voltage VCC occurs during a switching state of the power switch transistor M1 (one switching state corresponding to the power switch being on and another switching state corresponding to the power switch being off). This is quite advantageous with regard to increasing efficiency. In some embodiments as shown in the active-control waveform of FIG. 3, the power supply capacitor charging period occurs only while the power switch transistor M1 is off (e.g., from time t2 to time t3). In other embodiments, the power supply capacitor charging period occurs only while the power switch transistor M1 is on. As will be explained further herein, the active control of the power supply capacitor charging while both the power switch transistor M1 and the SR switch transistor are off (designated as a third period herein) helps to dampen the resonant oscillation of the drain-to-source voltage of the SR switch transistor during DCM operation. In another implementation, the active control of the power supply capacitor charging while both the power switch transistor M1 and the SR switch transistor are off in DCM operation may occur without any extra damping of the resonant oscillation. In such a no-damping active-control third period, the active control switching state during the resonant oscillation depends upon whether the drain-to-source voltage of the SR switch transistor is greater than or less than the output voltage Vout as will be explained further herein.

Figure 4:
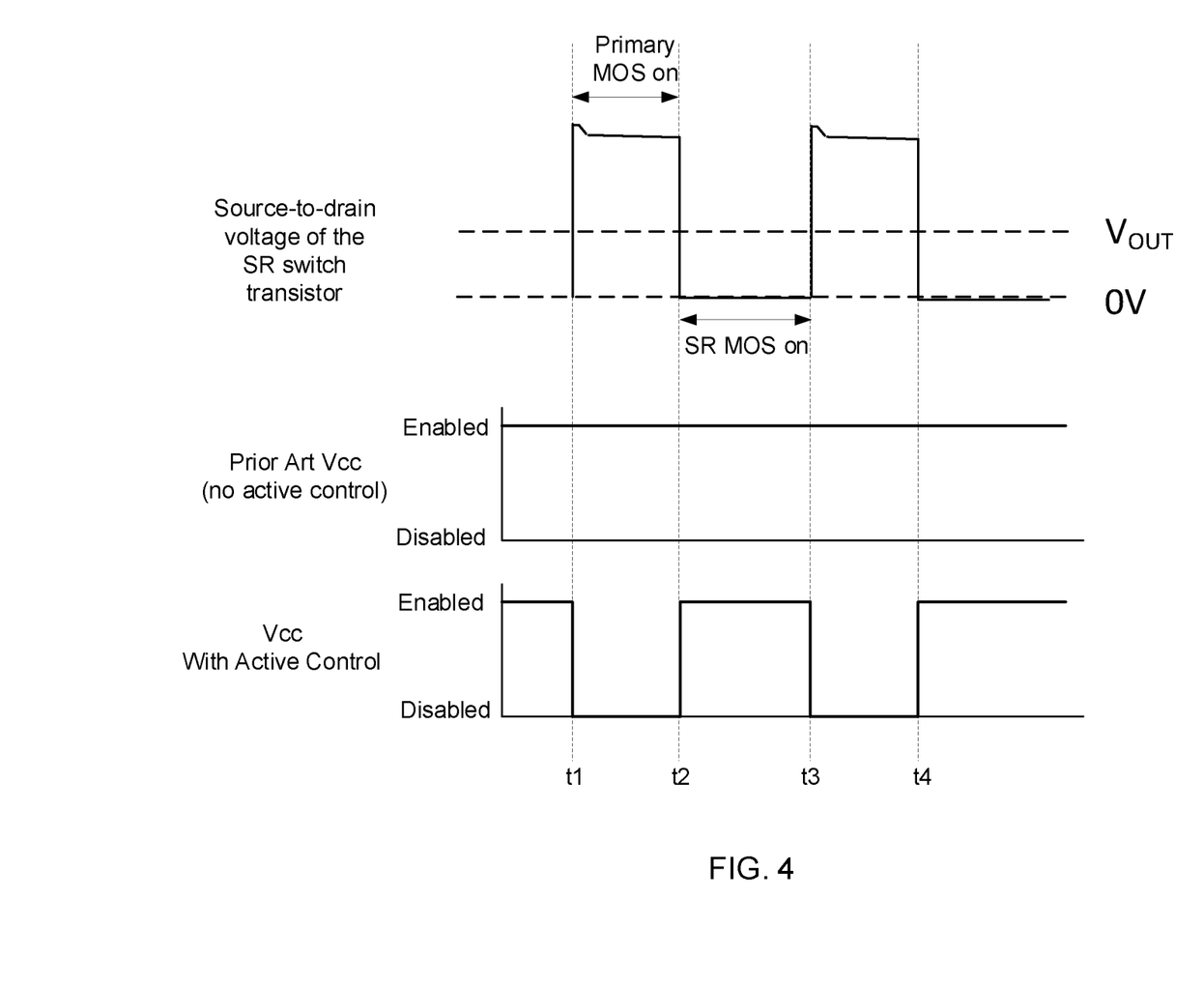
FIG. 4 compares some conventional operating waveforms for continuous conduction mode (CCM) operation to those for active control in accordance with an aspect of the disclosure.

Waveforms for CCM operation for both conventional and active control of the high-side SR controller power supply voltage are shown in FIG. 4. From a time t1 to approximately a time t2, the power switch transistor M1 is on. With the SR switch transistor being off and the power switch transistor M1 being on, the drain-to-source voltage of the SR switch transistors pulses high. With the power switch transistor M1 on-time period ending, the SR switch transistor is cycled on at time t2, which causes the secondary-winding current to pulse high and the SR switch transistor's drain-to-source voltage to drop to zero. The secondary-winding current then begins to decline during the on-time of the SR switch transistor. The secondary-winding current has not declined to zero at a time t3 (the end of the on-time for the SR switch transistor) when the power switch transistor M1 is again cycled on. In response to the cycling on of the power switch transistor M1 at time t3 (and also at time t1), the SR controller switches off the SR switch transistor so that the SR switch transistor's drain-to-source voltage surges high. If the auxiliary capacitor charging period occurs while the power switch transistor M1 is on, the VCC power supply voltage is not charged while the power switch transistor M1 is on (from time t1 to time t2 and from time t3 to a time t4). In such an auxiliary capacitor charging period implementation, the power supply capacitor is only charged when the SR switch transistor is cycled on such as from time t2 to time t3. This is again advantageous as the efficiency loss from using the relatively high drain-to-source voltage of the high-side SR switch transistor that occurs while the power switch transistor M1 is on is avoided.

Figure 5:
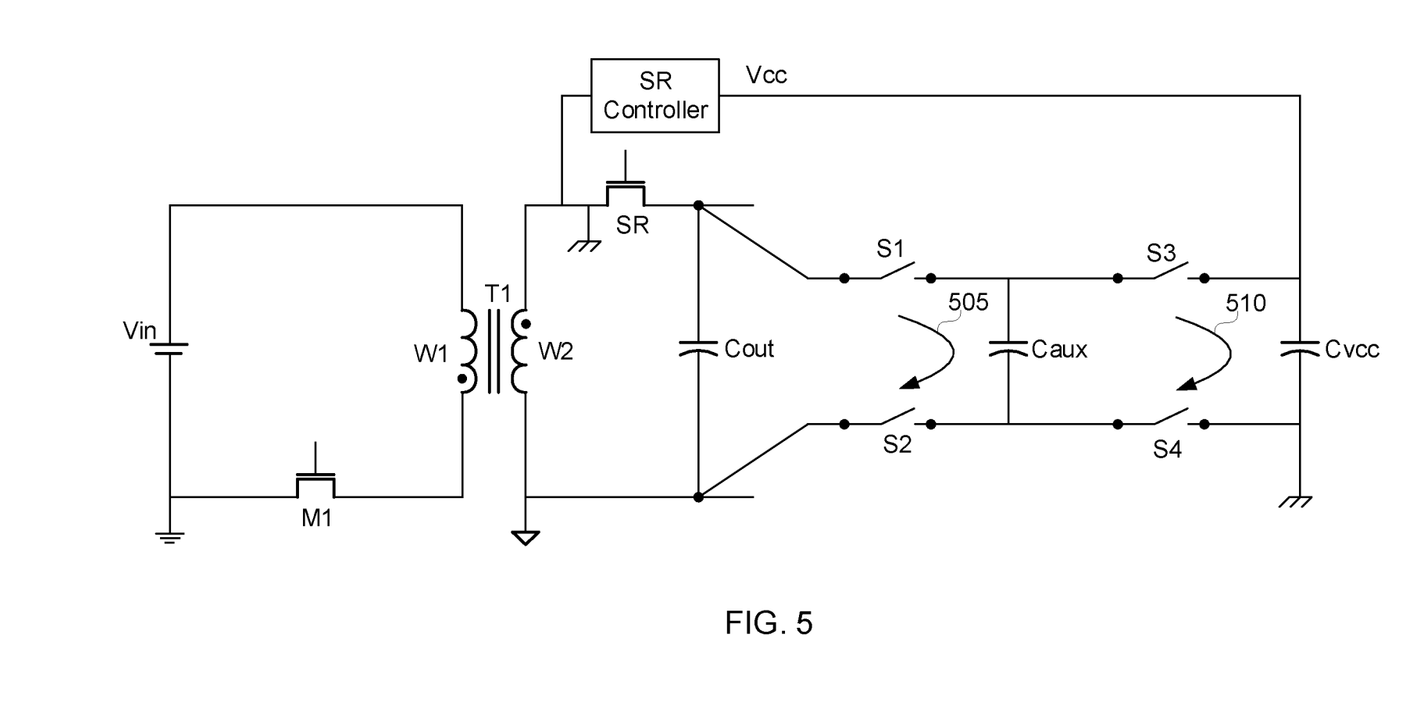
FIG. 5 illustrates a flyback converter with active control for the charging of the SR controller power supply voltage in which the charge source is the output capacitor in accordance with an aspect of the disclosure.

The charge source for charging the auxiliary capacitor during the auxiliary capacitor charging period may be either the output capacitor or the secondary winding depending upon the implementation. An example flyback converter 500 is shown in FIG. 5 in which the charge source for the active-control charging of the power supply voltage VCC is the output capacitor Cout. A terminal of the secondary winding W2 that couples to the source of the SR switch transistor couples through a switch S1 to an upper plate of the auxiliary capacitor Caux. This upper plate in turn couples through a switch S3 to an upper plate of the power supply capacitor (Cvcc) that provides the power supply voltage VCC to the SR controller. A bottom plate of the power supply capacitor couples through a switch S4 to the bottom plate of the auxiliary capacitor Caux. This bottom plate of the auxiliary capacitor Caux in turn couples through a switch S2 to the return voltage rail to the secondary-winding W2. Switches S1 through S4 may be passive switches (e.g., a diode) or active switches (e.g., a switch transistor). During the auxiliary capacitor charging period, a controller such as the SR controller controls the active switches so that switches S1 and S2 are closed and switches S3 and S4 are open while the power switch transistor is off. The resulting switching state in which switches S1 and S2 are closed and switches S3 and S4 are open may be denoted herein as a first switching state. A charging path 505 is active during the auxiliary capacitor charging period. In the power supply capacitor charging period, the SR controller opens switches S1 and S2 and closes switches S3 and S4 so that the auxiliary capacitor Caux may charge the Cvcc capacitor with the power supply voltage VCC as represented by a charging path 510. The resulting switching state in which switches S1 and S2 are open and switches S3 and S4 are closed may be denoted herein as a second switching state.

As will be explained further herein, the auxiliary capacitor charging period may instead occur while the power switch transistor M1 is on. Charging path 505 would be active during this period. The power supply capacitor charging period would then occur while the power switch transistor M1 is off. Charging path 510 is active during this period.

Figure 6:
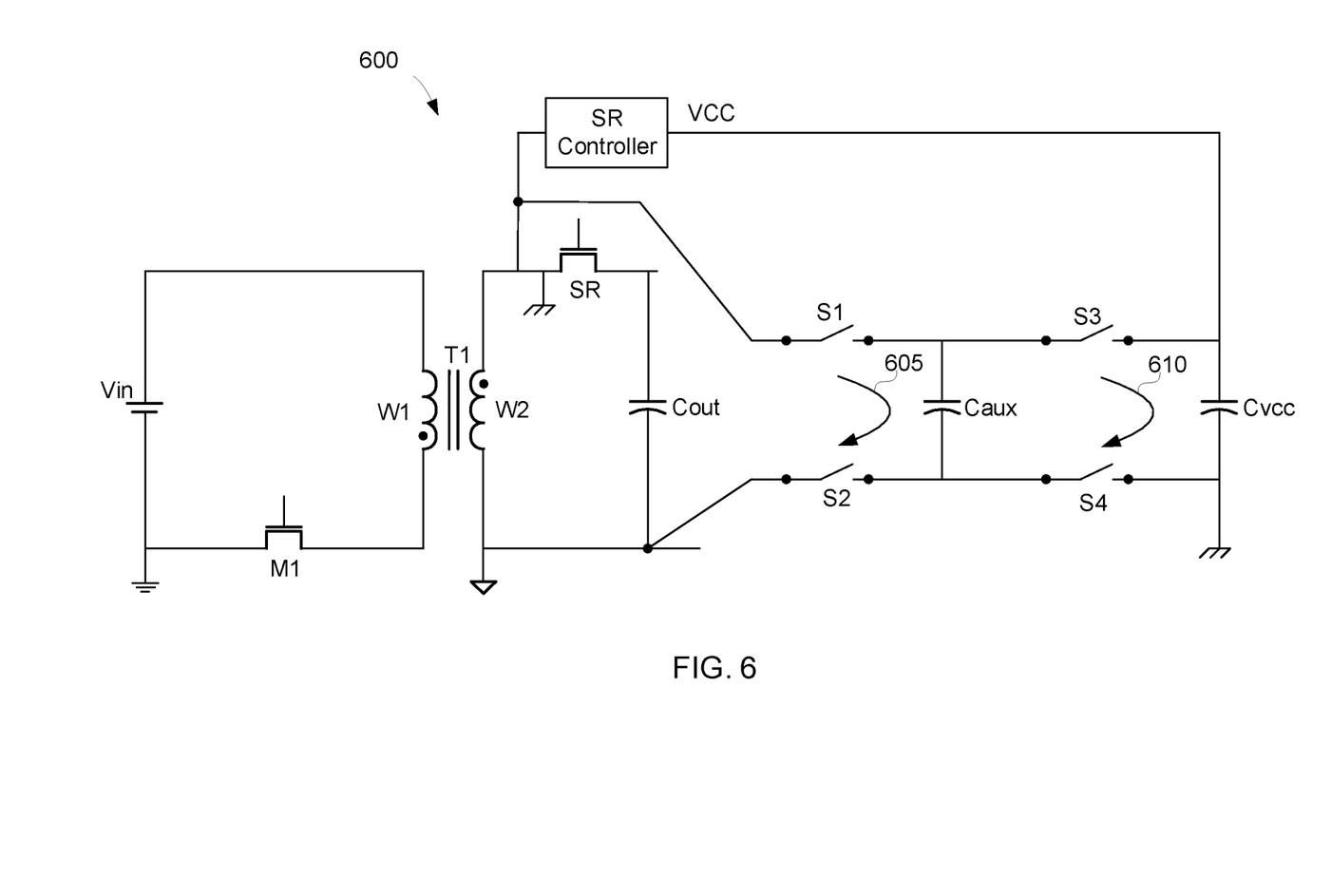
FIG. 6 illustrates a flyback converter with active control for the charging of the SR controller power supply voltage in which the charge source is the secondary winding in accordance with an aspect of the disclosure.

An example flyback converter 600 is shown in FIG. 6 in which the charge source for the active-control charging of the power supply capacitor (and thus the charge source for the charging of the power supply voltage VCC) is the secondary winding. An output voltage terminal of the secondary winding couples to the source of the SR switch transistor and also couples through a switch S1 to an upper plate of the auxiliary capacitor Caux. This upper plate in turn couples through a switch S3 to an upper plate of the power supply capacitor (Cvcc) that stores the power supply voltage VCC for the SR controller. A bottom plate of the power supply capacitor couples through a switch S4 to the bottom plate of the auxiliary capacitor Caux. This bottom plate of the auxiliary capacitor Caux in turn couples through a switch S2 to the return voltage rail, which couples to a return voltage terminal of the secondary-winding W2. As discussed for flyback converter 500, switches S1 through S4 may be passive switches (e.g., a diode) or active switches (e.g., a switch transistor). During the auxiliary capacitor charging period, a controller such as the SR controller controls the active switches so that switches S1 and S2 are closed and switches S3 and S4 are open. The energy stored in the secondary winding W2 thus charges the auxiliary capacitor Caux as represented by a charging path 605. As discussed previously, this auxiliary capacitor charging period is tied to either the on-state or the off-state of the power switch transistor M1 depending upon the implementation. In the power supply capacitor charging period, the SR controller opens switches S1 and S2 and closes switches S3 and S4 so that the auxiliary capacitor Caux may charge the power supply capacitor with the power supply voltage VCC as represented by a charging path 610.

Figure 7:
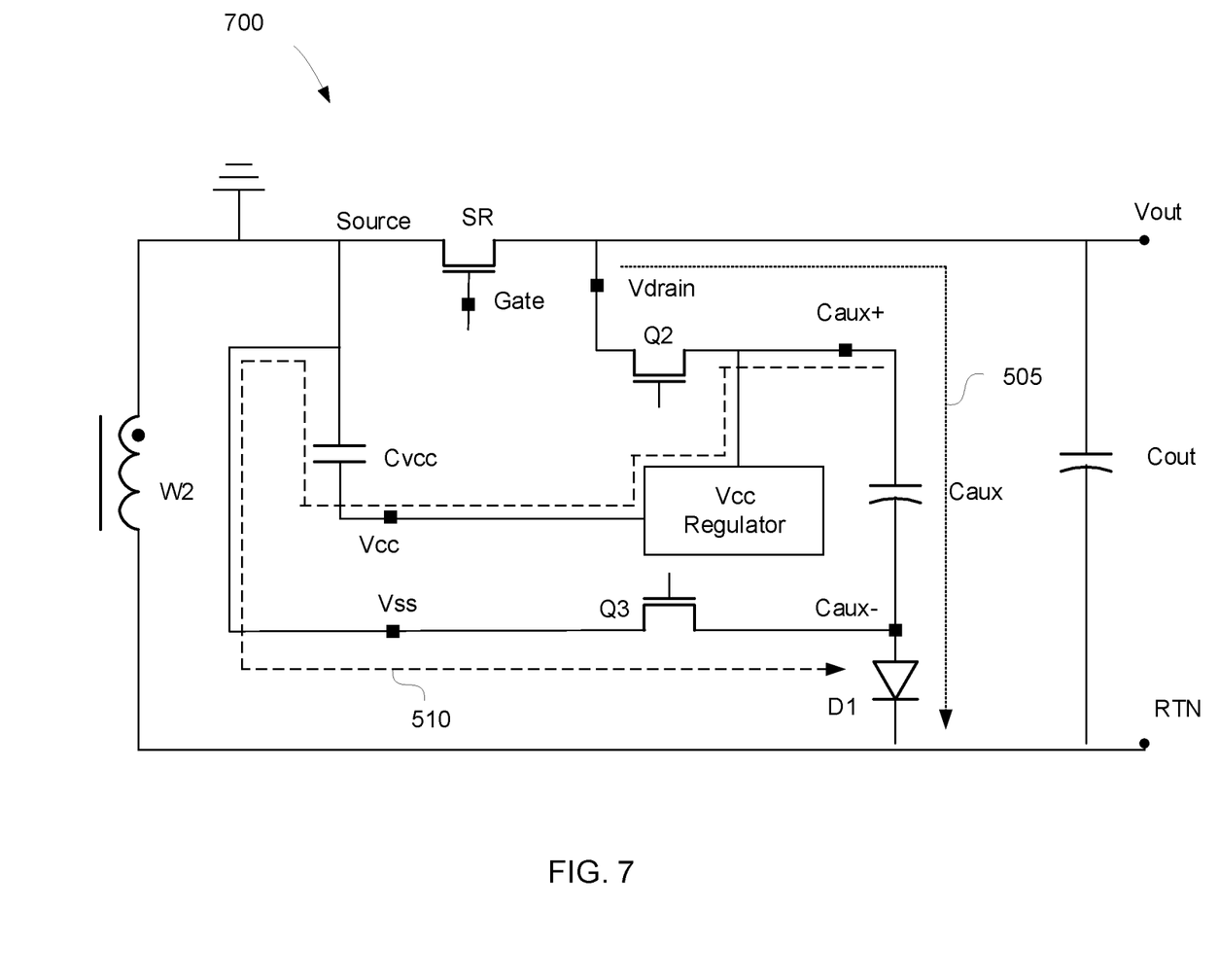
FIG. 7 is a circuit diagram of an example implementation of the flyback converter of FIG. 5 in accordance with an aspect of the disclosure.

A circuit diagram of an example implementation of a secondary side 700 of flyback converter 500 in which the auxiliary capacitor charging period occurs while the power switch transistor M1 is off is shown in FIG. 7. Recall that the charging source in flyback converter 500 is the output capacitor. The power supply capacitor charging period occurs in secondary-side 700 while the power switch transistor M1 is on. An NMOS switch transistor Q2 couples between the drain of the SR switch transistor and the positive plate of the auxiliary capacitor Caux. Switch transistor Q2 thus functions as the switch S1 of flyback converter 500 so that charging path 505 extends from the SR switch transistor drain through the switch transistor Q2, the auxiliary capacitor Caux, and finally through a diode D1 to the return rail. An anode of diode D1 couples to the negative plate of the auxiliary capacitor whereas a cathode of diode D1 couples to the return rail. Diode D1 thus functions as switch S2 of flyback converter 500. Charging path 505 is active during the auxiliary capacitor charging period, which in secondary-side 700 occurs while the power switch transistor M1 is off. The positive plate of the auxiliary capacitor Caux couples through a VCC regulator to the positive plate of the Cvcc capacitor. The VCC regulator thus includes the switch S3 of flyback converter 500. The VCC regulators disclosed herein may be implemented as a low-drop regulator (LDO), a switching power converter, or other types of suitable voltage regulators. An NMOS switch transistor Q3 couples between the negative plates of the auxiliary and power supply capacitors. Switch transistor Q3 thus functions as switch S4 of flyback converter 500. Charging path 510 extends from the positive plate of the auxiliary capacitor Caux through the VCC regulator, the power supply capacitor, and switch transistor Q3. Charging path 510 is active during the power supply voltage VCC charging period (in this implementation, when the power switch transistor M1 is on and the SR switch transistor is off).

Note that the voltage drop in charging paths 505 and 510 for secondary side 700 is just (Vout−Vcaux)+(Vcaux−VCC) =Vout−VCC, where Vcaux is the voltage across the auxiliary capacitor Caux. Suppose the parameters for a flyback converter with secondary side 700 are as discussed for conventional flyback converter 100 (Vin=320 V, turns ratio=5, Vout=20 V, VCC=10V, and secondary-winding current of 10 mA). The power loss through charging paths 505 and 510 would then be just 100 mW, which is substantially less than for the conventional VCC charging of flyback converter 100.

Figure 8:
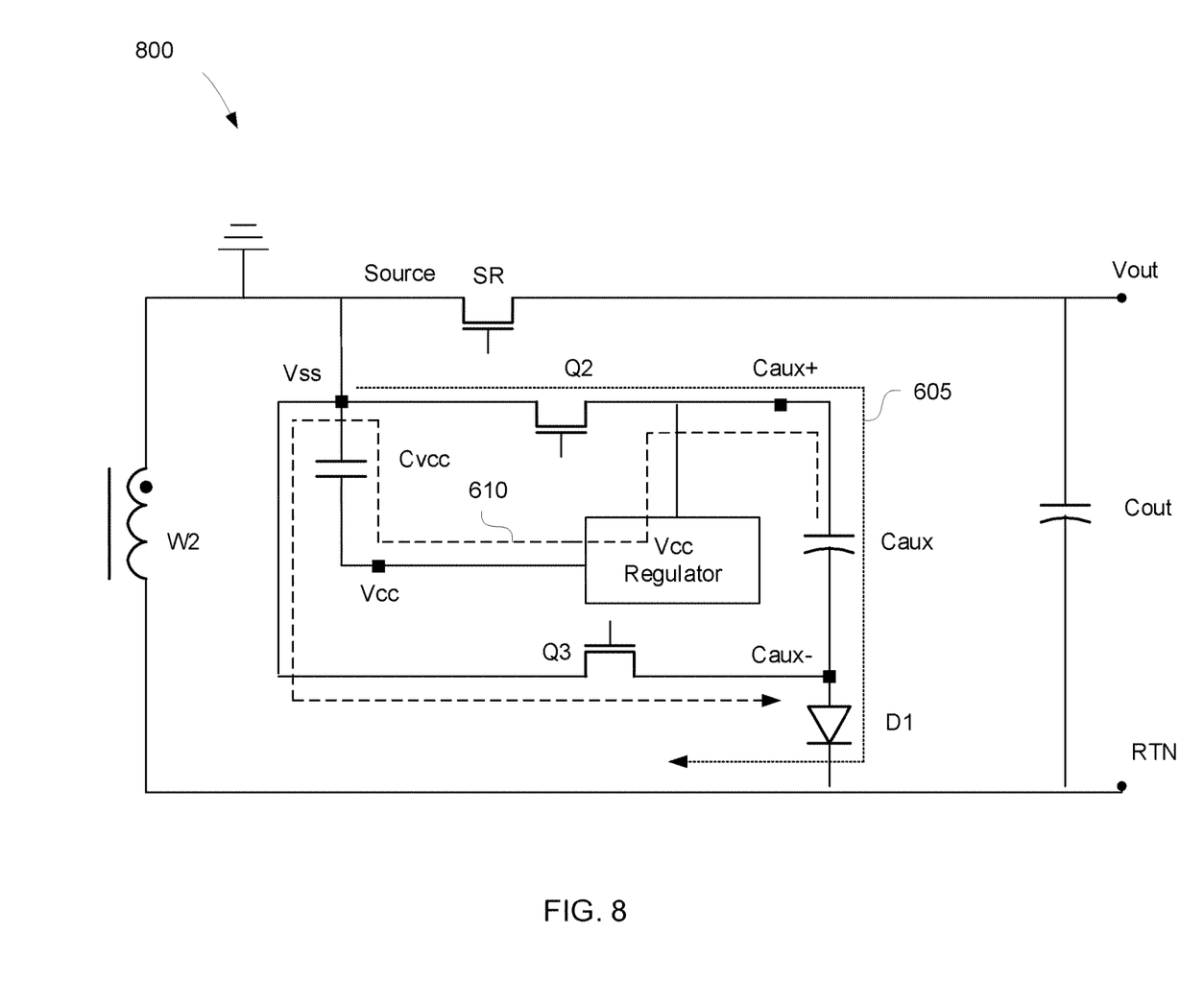
FIG. 8 is a circuit diagram of an example implementation of the flyback converter of FIG. 6 in accordance with an aspect of the disclosure.

A circuit diagram of an example implementation of a secondary-side 800 of flyback converter 600 is shown in FIG. 8. The charging source for flyback converter 600 is the secondary winding W2. An NMOS switch transistor Q2 couples between an output voltage terminal of the secondary winding W2 that couples to the source of the SR switch transistor and the positive plate of the auxiliary capacitor Caux. Switch transistor Q2 thus functions as the switch S1 of flyback converter 600 so that a charging path 605 extends from the SR switch transistor source through the switch transistor Q2, the auxiliary capacitor Caux, and finally through a diode D1 to the return rail. The negative plate of the auxiliary capacitor Caux couples to ground (which is also the ground return terminal of the secondary winding W2) through the diode D1 that functions as switch S2 of flyback converter 500. Charing path 605 is active (conducting charge) during the auxiliary capacitor charging period. The positive plate of the auxiliary capacitor Caux couples through a VCC regulator to the positive plate of the power supply capacitor. The VCC regulator thus includes the switch S3 of flyback converter 600. An NMOS switch transistor Q3 couples between the negative plates of the auxiliary and power supply capacitors. Switch transistor Q3 thus functions as switch S4 of flyback converter 600. Charging path 610 extends from the positive plate of the auxiliary capacitor Caux through the VCC regulator, the Cvcc capacitor, and switch transistor Q3. Charging path 610 is active during the power supply voltage VCC charging period. The power savings as discussed for a flyback converter with secondary side 700 are the same in a flyback converter with secondary side 800.

Figure 9:
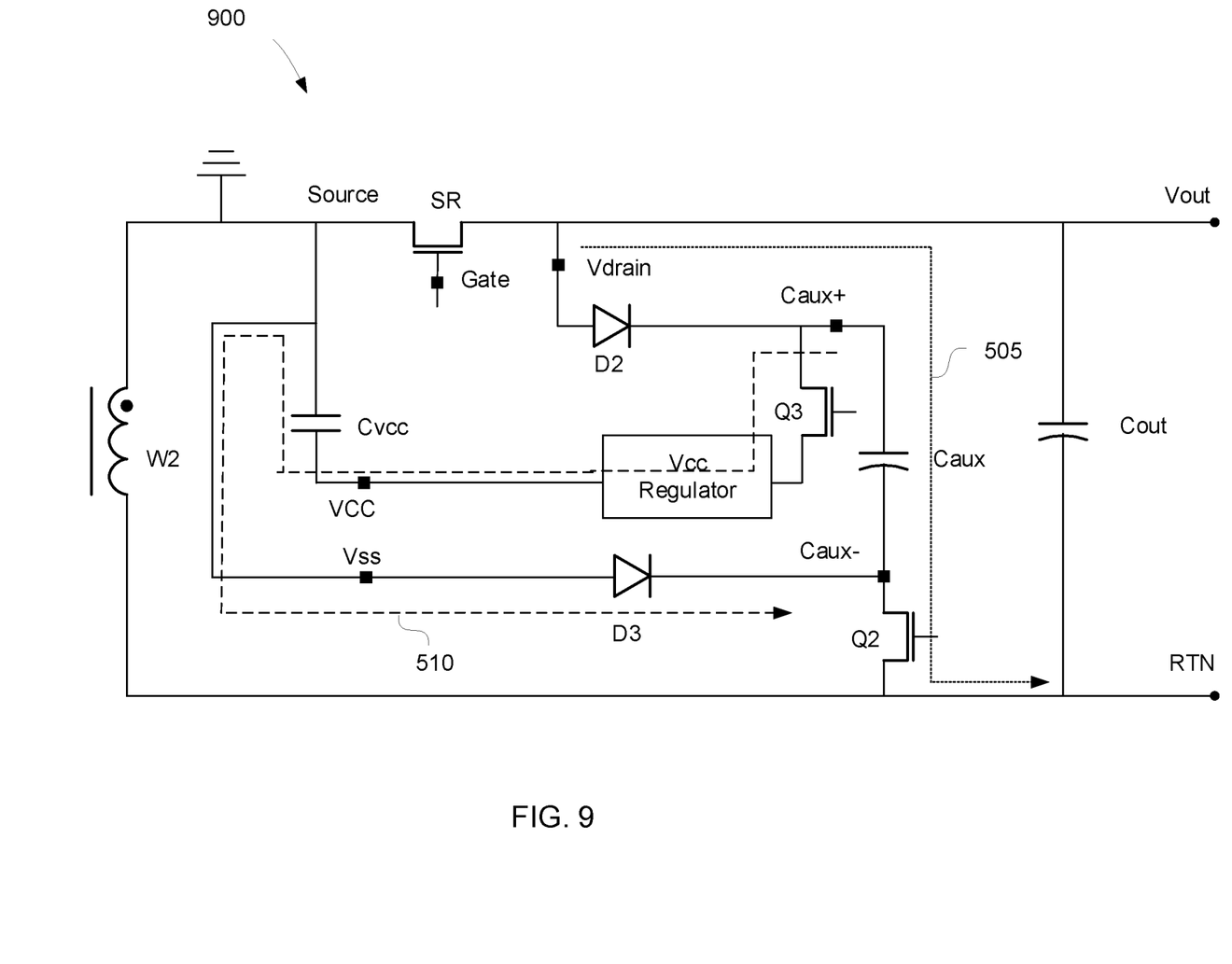
FIG. 9 is a circuit diagram of an example implementation of the flyback converter of FIG. 5 in accordance with an aspect of the disclosure.

A circuit diagram of another secondary-side implementation (secondary-side 900) of flyback converter 500 is shown in FIG. 9. In contrast to secondary-sides 700 and 800, secondary-side 900 functions so that the auxiliary capacitor charging period occurs while the power switch transistor M1 is on. The power supply capacitor charging period in secondary-side 900 thus occurs while the power switch transistor M1 is off. A cathode of a diode D2 couples to the positive plate of the output capacitor Cout (the drain of the SR switch transistor) whereas an anode of diode D2 couples to the positive plate of the auxiliary capacitor Caux. Diode D2 thus functions as switch S1 of flyback converter 500. A switch transistor Q2 couples between the negative plate of the auxiliary capacitor Caux and the return rail. Switch transistor Q2 thus functions as switch S2 in flyback converter 500. The positive plate of the auxiliary capacitor Caux couples through a switch transistor Q3 and through the VCC voltage regulator to the positive plate of the Cvcc capacitor.

Switch transistor Q3 thus functions as switch S3 of flyback converter 500. Referring again to secondary sides 700 and 800, the equivalent of switch transistor Q3 in secondary side 900 is not shown for illustration clarity in FIGS. 7 and 8 but may be configured analogously as shown for secondary side 900. The negative plate of the power supply capacitor (Cvcc) couples to a cathode of a diode D3. The anode of diode D3 couples to the negative plate of the auxiliary capacitor Caux. Diode D3 thus functions as switch S4 in flyback converter 500. SR controller U2 functions to switch on switch transistor Q2 and switch off transistor Q3 during the auxiliary capacitor charging period when the power switch transistor M1 is on and the SR switch transistor is off. Charging path 505 is thus active during the auxiliary capacitor charging period. Charging path 505 extends from the positive plate of the output capacitor Cout through diode D1, the auxiliary capacitor Caux, and the switch transistor Q2 to the return rail. SR controller U2 also functions to switch off switch transistor Q2 and switch on transistor Q3 during the power supply capacitor charging period when the power switch transistor M2 is off and the SR switch transistor is on. Charging path 510 is active during the power supply voltage VCC charging period. Charging path 510 extends from the positive plate of the auxiliary capacitor Caux through switch transistor Q3, the VCC voltage regulator, and the Cvcc capacitor to the negative plate of the auxiliary capacitor Caux. The power loss savings for the VCC charging in a flyback converter including secondary side 900 are the same as discussed for flyback converters with secondary sides 700 or 800.

As noted earlier, there is a third switching period that exists during DCM operation from the end of the on-time of the SR switch transistor to the beginning of the subsequent on-time of the power switch transistor M1. This third switching period is thus concurrent with the ringing oscillation of the drain-to-source voltage of the SR switch transistor. The third switching period may thus be denoted as a ringing damping period. In the ringing damping period, switches S2 and S4 are on and switches S1 and S3 off in flyback converters 500 and 600. In secondary sides 700 and 800, only switch transistor Q3 need be cycled on during the ringing damping period. In secondary side 900, only switch transistor Q2 need be cycled on during the ringing damping period.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A controller for a flyback converter with a high-side synchronous rectifier switch transistor, comprising:
   an auxiliary capacitor;
   a power supply capacitor for storing a power supply voltage for the controller; and
   a plurality of switches having a first switching state in which the auxiliary capacitor is coupled to a charge source and the power supply capacitor is isolated from the auxiliary capacitor and having a second switching state in which the auxiliary capacitor is isolated from the charge source and coupled to charge the power supply capacitor.

2. The controller of claim 1, wherein the controller is a synchronous rectifier controller configured to control a cycling of the high-side synchronous rectifier switch transistor responsive to a switching state of a power switch transistor, and wherein the synchronous rectifier controller is further configured to control the plurality of switches so that the first switching state occurs while the power switch transistor is off and so that the second switching state occurs while the power switch transistor is on.

3. The controller of claim 1, wherein the controller is a synchronous rectifier controller configured to control a cycling of the high-side synchronous rectifier switch transistor responsive to a switching state of a power switch transistor, and wherein the synchronous rectifier controller is further configured to control the plurality of switches so that the first switching state occurs while the power switch transistor is on and so that the second switching state occurs while the power switch transistor is off.

4. The controller of claim 1, wherein the charge source comprises an output capacitor having a positive plate coupled to a drain of the high-side synchronous rectifier switch transistor, and wherein the plurality of switches comprises:
   a first switch coupled between the positive plate of the output capacitor and a positive plate of the auxiliary capacitor;
   a second switch coupled between a negative plate of the auxiliary capacitor and a negative plate of the output capacitor;
   a third switch coupled between the positive plate of the auxiliary capacitor and the positive plate of the power supply capacitor; and
   a fourth switch coupled between the negative plate of the auxiliary capacitor and a negative plate of the power supply capacitor.

5. The controller of claim 1, wherein the charge source comprises a secondary winding of a transformer having an output voltage terminal coupled to a source of the high-side synchronous rectifier switch transistor, and wherein the plurality of switches comprises:
   a first switch coupled between the output voltage terminal of the secondary winding and a positive plate of the auxiliary capacitor;
   a second switch coupled between a negative plate of the auxiliary capacitor and a ground return terminal of the secondary winding;
   a third switch coupled between the positive plate of the auxiliary capacitor and a positive plate of the power supply capacitor; and
   a fourth switch coupled between the negative plate of the auxiliary capacitor and a negative plate of the power supply capacitor.

6. The controller of claim 4, wherein the first switch comprises a first switch transistor, the second switch comprises a diode, and the fourth switch comprises a second switch transistor.

7. The controller of claim 6, wherein the third switch comprises a third switch transistor that couples to the positive plate of the power supply capacitor through a power supply voltage regulator.

8. The controller of claim 7, wherein the controller is further configured to:
   switch off the first switch transistor, switch on the second switch transistor, and switch on the third switch transistor while a power switch transistor is on, and switch on the first switch transistor, switch off the second switch transistor, and switch off the third switch transistor while the power switch transistor is off.

9. The controller of claim 5, wherein the first switch comprises a first switch transistor, the second switch comprises a diode, the third switch comprises a second switch transistor coupled to the positive plate of the power supply capacitor through a power supply voltage regulator, and the fourth switch comprises a third switch transistor.

10. The controller of claim 9, wherein the controller is further configured to:
switch off the first switch transistor, switch on the second switch transistor, and switch on the third switch transistor while a power switch transistor is on, and
switch on the first switch transistor, switch off the second switch transistor, and switch off the third switch transistor while the power switch transistor is off.

11. The controller of claim 4, wherein the first switch comprises a first diode, the second switch comprises a first switch transistor, the third switch comprises a second switch transistor coupled to the positive plate of the power supply capacitor through a power supply voltage regulator, and the fourth switch comprises a second diode.

12. The controller of claim 11, wherein the controller is configured to:
switch on the first switch transistor and switch off the second switch transistor while a power switch transistor is on; and
switch off the first switch transistor and switch on the second switch transistor while the power switch transistor is off.

13. The controller of claim 12, wherein the controller is further configured to switch on the first switch transistor and switch off the second switch transistor while both the power switch transistor and a synchronous rectifier switch transistor are off.

14. A method of charging a power supply voltage for a secondary-side flyback controller, comprising:
while a power switch transistor is in a first switching state, charging an auxiliary capacitor from a charge source while isolating the auxiliary capacitor from a power supply capacitor storing the power supply voltage;
while the power switch transistor is a second switching state that is a complement of the first switching state, coupling the auxiliary capacitor to the power supply capacitor to charge the power supply capacitor with the power supply voltage while isolating the auxiliary capacitor from the charge source; and
using the power supply voltage to power a controller for controlling a cycling on and off of a high-side synchronous rectifier switch transistor.

15. The method of claim 14, wherein the first switching state occurs when the power switch transistor is off and the second switching state occurs when the power switch transistor is on.

16. The method of claim 14, wherein the first switching state occurs when the power switch transistor is on and the second switching state occurs when the power switch transistor is off.

17. The method of claim 15, wherein charging the auxiliary capacitor from the charge source comprises charging the auxiliary capacitor from an output capacitor having a positive plate coupled to a drain of the high-side synchronous rectifier switch transistor.

18. The method of claim 15, wherein charging the auxiliary capacitor from the charge source comprises charging the auxiliary capacitor from a secondary winding having an output voltage terminal coupled to a source of the high-side synchronous rectifier switch transistor.

19. The method of claim 15, wherein charging the auxiliary capacitor from the charge source while isolating the auxiliary capacitor from the power supply capacitor comprises configuring a plurality of switches.

20. The method of claim 19, wherein configuring the plurality of switches comprises configuring four switches.

\* \* \* \* \*